United States Patent Office 3,382,286
Patented May 7, 1968

3,382,286
PREPARATION OF AROMATIC TERTIARY
ALCOHOLS BY OXIDATION
William D. Griffin, Morristown, N.J., Colin R. McArthur, Liverpool, N.Y., and Zalik Oser, Falls Church, Va., assignors to Allied Chemical Corporation, New York, N.Y., a corporation of New York
No Drawing. Filed Jan. 21, 1965, Ser. No. 427,092
8 Claims. (Cl. 260—618)

This invention relates to the preparation of aromatic tertiary alcohols by oxidation of tertiary carbon substituted aromatic compounds, i.e. compounds in which a t-carbon atom is joined directly to an aromatic ring, with a gas containing elemental oxygen.

In the past it has been proposed to prepare aromatic alcohols by treating teritary carbon substituted aromatic compounds with elemental oxygen in the presence of various compounds to promote the reaction. Such processes have resulted in the formation of considerable proportions of other oxidation products such as ketones and acids.

In U.S. Patent Number 2,881,220, issued Apr. 7, 1959, there is described the production of a dimethyl aryl carbinol from an alpha-hydroperoxide such as a phenyl or $C_1$–$C_3$ alkylphenyl dimethyl methine hydroperoxide by treatment with solid tripotassium phosphate. However the process of this patent has several disadvantages. First, the hydroperoxide must be prepared. This normally involves oxidation of a tertiary alkyl aromatic compound, such as cumene or disopropylbenzene, under closely controlled conditions. Second, in preparing an oxidation reaction product from such a compound, to form the hydroperoxide, generally less than 50% of the compound is oxidized to hydroperoxide and unless an intermediate separation is effected, upon reduction of the hydroperoxide to alcohol a major proportion of the resulting reaction mixture is unoxidized t-alkyl compound. Finally, the conversion of the hydroperoxide to an alcohol in the presence of solid tripotassium phosphate becomes quite slow when the concentration of the hydroperoxide in the reaction mixture has been lowered to about 10–15% by weight and practically ceases at 5% by weight.

It is, therefore, an object of this invention to provide a process whereby tertiary carbon substituted aromatic compounds are converted to tertiary alcohols in relatively high yield and with smaller conversion to by products than in prior art processes.

Another object of this invention is to provide a process as described above wherein the major proportion of t-alkyl compound can be converted to a tertiary alcohol.

A further object of the present invention is to provide a one-step process as described above whereby it is possible to obtain a reaction product containing less than 5% hydroperoxide.

Additional objects and advantages of this invention will become apparent from the following detailed description thereof.

In accordance with the present invention we have discovered that tertiary aliphatic carbon atoms can be oxidized by a gas containing elemental oxygen to produce tertiary alcohols in high yields if such oxidation is conducted in the presence of an aqueous solution of tripotassium phosphate. Tertiary carbon atoms which can be oxidized by our process must be attached to one carbon atom of an aromatic nucleus such as a phenyl or naphthyl ring, to one hydrogen atom, and to two other saturated carbon atoms each of which is in turn attached to a member selected from the group consisting of hydrogen and hydrocarbon radicals such as alkyl groups. The aromatic nucleus can be substituted with any substituent which does not interfere with the oxidation reaction such as alkyl, hydroxyalkyl and halogen. In a class of compounds particularly preferred for practicing the present invention, the aromatic nucleus is a benzene ring and from one to three tertiary carbon atoms are attached thereto. These preferred compounds have the formula:

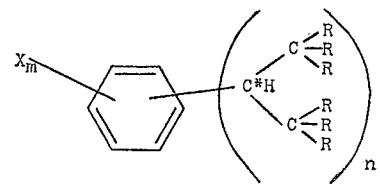

wherein C* is the tertiary carbon atom to be oxidized, R at each occurrence is a member independently selected from the group consisting of hydrogen and alkyl groups of one to five carbon atoms, $n$ is an integer of from one to three, X is a member selected from the group consisting of alkyl attached to the benzene ring by a primary or secondary carbon atom, hydroxyalkyl and halogen, and $m$ is an integer of from 0 to 2 with the sum of $m$ and $n$ being not more than 4, any unspecified valences being satisfiied with hydrogen. Typical of such compounds are isopropylbenzene; meta- and para-diisopropylbenzene; 1,3, 5-triisopropylbenzene; the isopropylphenyl dimethyl carbinols obtained upon oxidizing one isopropyl group in a di- or triisopropylbenzene and by oxidizing two isopropyl groups in a triisopropylbenzene; halocumenes such as p-fluorocumene; secondary butyl benzene and cymene.

According to our process, the gas containing elemental oxygen can be oxygen, oxygen mixed with an inert gas such as nitrogen, air, or combinations thereof. The rate of flow of incoming gas is not critical, providing a sufficient quantity of oxygen is being supplied for the oxidation reactions taking place. However, oxygenating so that the gas is dispersed through the liquid phase gives a faster rate of oxidation than merely allowing the gas to pass over the surface while mixing. The gas pressure employed can be atmospheric, which is generally the most convenient; however, superatmospheric pressure can be used to increase the oxygen partial pressure and/or to permit reaction temperatures above the normal boiling point of the reaction mixture.

The tripotassium phosphate concentration markedly affects the percentage of the tertiary carbon atoms present on which hydrogen atoms attached thereto are replaced with hydroxyl groups. If insufficient tripotassium phosphate is used, a large percentage of the t-alkyl compound will remain unoxidized, and/or if the t-alkyl compound contains more than one tertiary carbon atom per molecule, all of the tertiary carbon atoms will be oxidized on very few of the molecules. The amount of tripotassium phosphate employed should be at least 0.05 mole, preferably 0.10 mole, per mole of t-alkyl compound divided by the number of tertiary carbon atoms attached to the aromatic nucleus to be oxidized.

The amount of water present should be sufficient to maintain completely dissolved the specified amount of tripotassium phosphate. Excessive dilution which reduces effective contact and reaction rate should be avoided.

The exact mechanism of the reactions is not fully understood, but it is known that during the initial stages of oxidation the tertiary hydroperoxide is formed which decomposes in the presence of tripotassium phosphate to give a tertiary alcohol. The reaction can be continued until substantially all of the hydroperoxide has been decomposed and a maximum tertiary alcohol content has been reached, or it can be stopped sooner as economics dictate. By the process of this invention over 60% of the aralkyl compound can be consistently converted to a tertiary alcohol. In a typical operation at 120° C. employing 1,3,5-triisopropylbenzene, it was found that the concentration of hydroperoxide in the reaction mixture increased rapidly during the first 7 hours to about 21% by weight and thereafter dropped quite sharply until after 30 hours substantially all of the hydroperoxide had been converted to other products and practically all of the hydrocarbon had been converted to its carbinol derivatives.

Suitably the t-alkyl compound is introduced into a reaction vessel equipped with a gas inlet tube, stirrer, thermometer, and reflux condenser. The desired amount of tripotassium phosphate in aqueous solution is added. The reaction mixture is brought to a temperature of from about 80° C. to the boiling point of the reaction mixture at the prevailing pressure, while air or other oxygen-containing gas is bubbled through the mixture. The flow rate should provide more oxygen than the reaction consumes so that an exit gas containing oxygen will be found. The oxidation is continued at least until a substantial amount of t-alkyl compound has been converted to the corresponding tertiary alcohol, and can be continued to high levels of reaction of the hydrocarbons with a minimum of side reactions. During the reaction water may be added, either as liquid or as vapor saturating the ingoing gas, to replace water evaporated during the process, as necessary to maintain the phosphate in solution.

The following examples illustrate the invention:

Temperature has a decided influence on the reaction and for optimum results especially in the oxidation of triisopropyl benzene to the triol a temperature of at least 110° C. is desirable. Thus at a temperature of 120° C. a triol yield of 45% has been obtained compared to about 7% at 100° C. under otherwise similar conditions.

Example 1

Oxidation of 1,3,5-triisopropylbenzene having a 99.5% purity was carried out in a one-liter resin pot fitted with a motor-driven stirrer, thermocouple well, gas bubbler, and reflux condenser. 125 ml. of 1,3,5-triisopropylbenzene, 50 gm. of tripotassium phosphate, and 25 ml. of water were added, the temperature was maintained at 120° C., and oxygen was bubbled through at a rate of 20 liters per hour. Samples of the reaction mixture were withdrawn periodically and analyzed for hydroperoxide content and the contents by weight of the different alcohols present. The alcohols were determined by vapor phase chromatography. The hydroperoxide content was determined by dissolving 2 ml. aliquots of the reaction mixture in 6 ml. of isopropyl alcohol and 15 ml. of glacial acetic acid and then adding 2 ml. of saturated aqueous solution of sodium iodide. The resulting solution was diluted with 75 ml. of distilled water and titrated with 0.1 M sodium thiosulfate using starch as indicator. The results are summarized in the following table.

TABLE I

| Time, Hours | Mono-ol | Diol | Triol | Hydroperoxide | Percent Reacted |
|---|---|---|---|---|---|
| 3.0 | 31 | 8 | Trace | 27 | 39 |
| 4.5 | 40 | 22 | 4 | 29 | 66 |
| 8.0 | 32 | 40 | 17 | 21 | 89 |
| 24.0 | 9 | 37 | 54 | 0 | 99+ |
| 29.5 | 7 | 33 | 60 | 0 | 99+ |

After 29.5 hours there were obtained 82.1 grams of product.

Example 2

266 grams of 1,3,5-triisopropylbenzene having a purity of 88.8% were added to a reactor equipped with a reflux condenser, motor-driven stirrer, thermometer, and gas inlet tube, and a solution of 125 gm. of hydrated tripotassium phosphate in 62.5 gm. of water was added. A temperature of 120° C. was maintained and oxygen was bubbled through the reaction mixture at 50 liters per hour. The hydroperoxide content was periodically determined by the procedure outlined in Example 1, and these results are summarized in Table II.

TABLE II

| Time, hours: | Percent hydroperoxide |
|---|---|
| 1.0 | 0.31 |
| 4.0 | 3.88 |
| 5.0 | 17.50 |
| 6.0 | 19.80 |
| 7.0 | 21.10 |
| 7.5 | 20.40 |
| 10.0 | 13.20 |
| 25.0 | 3.37 |
| 30.0 | 0.71 |
| 50.0 | 0.00 |

After 50 hours, 99.9% of the 1,3,5-triisopropylbenzene had been reacted. The yield of alcoholic derivatives of 1,3,5-triisopropylbenzene was about 80%. The relative proportions of these alcohols were mono-ol, 3.0%; diol, 33.4%; and triol, 63.6%.

Example 3

Using the apparatus of Example 2, a series of experiments were carried out to determine the effect on conversion of 1,3,5-triisopropylbenzene to the tricarbinol, if any, with rate of gas flow, and whether passing the gas over the surface of the reaction mixture while stirring vigorously would be as effective. The experiments were run at 120° C. for 24 hours using 47 grams of tripotassium phosphate and 23.5 grams of water per 100 grams of 1,3,5-triisopropylbenzene. The purity of the 1,3,5-triisopropylbenzene was about 88%. The results, determined by vapor phase chromatography, are summarized in Table III, where "TIB" refers to 1,3,5-triisopropylbenzene.

TABLE III

| Conditions: | Percent conversion to triol |
|---|---|
| $O_2$, 18.8 l./hr./100 g. TIB | 57.8 |
| $O_2$, 9.4 l./hr./100 g. TIB | 50.7 |
| Air, 37.6 l./hr./100 g. TIB | 50.3 |
| Air, 18.8 l./hr./100 g. TIB | 53.8 |
| Air, 18.8 l./hr./100 g. TIB, over surface | 31.2 |

Example 4

A series of experiments were carried out in the apparatus described in Example 2 to determine the effect of varying the proportions of tripotassium phosphate on the oxidation of 1,3,5-triisopropylbenzene. The 1,3,5-triisopropylbenzene employed in these experiments had the following analysis: 0.1% m-diisopropylbenzene; <0.1% o-diisopropylbenzene; 87.5% 1,3,5-triisopropylbenzene; 9.9% 1,2,4-triisopropylbenzene, and 1.0% tetraisopropylbenzene. Temperature was maintained at 120° C. and flow rates of air at 18.8 liters per hour per 100 grams of 1,3,5-triisopropylbenzene. The reaction was stopped after 24 hours, and analysis of the product was obtained by vapor phase chromatography. The results are summarized below.

TABLE IV

| Weight $K_3PO_4.H_2O$ per 100 Grams TIB [1], grams | Yield of TIB Alcohols, Percent | Relative Proportions of TIB Alcohol | | |
|---|---|---|---|---|
| | | Mono-ol, Percent | Diol, Percent | Triol, Percent |
| 23.5 | 66 | 13.1 | 42.4 | 44.5 |
| 35.2 | 77 | 13.1 | 41.3 | 45.6 |
| 47.0 | 79 | 3.2 | 28.7 | 68.1 |

[1] TIB refers to 1,3,5,-triisopropylbenzene.

Example 5

In a reactor similar to that used in Example 1, isopropylbenzene, and meta- and para-diisopropylbenzenes were oxidized to the corresponding carbinols. Isopropylbenzene was oxidized by adding a solution of 15.9 grams of hydrated tripotassium phosphate in 7.8 grams of water for each 100 grams of starting material. The diisopropylbenzenes were added to a solution of 31.2 grams of hydrated tripotassium phosphate in 15.3 grams of water for each 100 grams of starting material. In all cases temperature was maintained at 110°–120° C. and a stream of 15.5 liters of air per hour for each 100 grams of starting material was bubbled through the reaction mixture. Samples were taken at intervals and analyzed by vapor phase chromatography. The results are summarized in the table below.

TABLE V

| Starting Material | Time, Hours | Percent Conversion | |
|---|---|---|---|
| | | Mono-ol | Diol |
| Isopropylbenzene | 16.0 | 47.4 | |
| | 24.0 | 71.9 | |
| m-Diisopropylbenzene | 16.0 | 35.1 | 39.6 |
| | 22.5 | 23.1 | 50.0 |
| p-Diisopropylbenzene | 16.0 | 30.0 | 47.2 |

Example 6

A mixture of 266 grams of 1,3,5-triisopropylbenzene (vapor phase chromatograph analysis of 0.8% diisopropylbenzene; 93.9% 1,3,5-triisopropylbenzene; 5.2% 1,2,4-triisopropylbenzene and 0.1% tetraisopropylbenzene) and a solution of 125 grams of hydrated tripotassium phosphate in 62.5 grams of water was charged to a two-liter, baffled resin flask equipped with a stainless steel impeller, a high-speed reflux condenser, thermometer, and a gas inlet tube extending below the impeller. Air was bubbled through at 50 liters per hour. After 24 hours of oxidation at a temperature of 120° C. with vigorous agitation the reaction was terminated and 500 ml. of 10% aqueous sodium hydroxide were added to form water soluble salts of the acidic by-products. The temperature was kept at 100° C. and the mixture stirred vigorously for about 5 minutes. The mixture was then transferred to a separatory funnel and shaken vigorously until all phases were homogeneously distributed. About half of the homogeneous mixture (410 ml.) was discarded for ease in handling. 100 ml. of 1,3,5-triisopropylbenzene were added to the remaining 410 ml. of mixture to extract the carbinols. After standing, three phases separated and the water layer was discarded. 1200 ml. of hot water were then added and the mixture shaken for about 15 min. while maintaining the temperature at about 95-98° C. After two hours of standing at this temperature, two phases separated. The aqueous layer containing the tricarbinol was placed in a flask with a stirrer and a Dean-Stark trap. 150 ml. of toluene were added with stirring and then heated until all the water was removed by azeotropic distillation. The remaining toluene solution was allowed to cool and the tricarbinol crystallized out as a white solid. The solid was recovered by filtration and dried to give 72.2 grams of material which contained 84.4% of 1,3,5-tris(2-hydroxy-2-propyl)benzene and 4.5% of a mixture of the diols of 1,3,5-triisopropylbenzene It will be apparent that many modifications and variations can be effected without departing from the scope of the novel concepts of the present invention, and the illustrative details disclosed are not to be construed as imposing undue limitations on the invention.

We claim:
1. A process of preparing a tertiary alcohol by oxidizing a tertiary carbon atom of an organic compound, said process comprising contacting a liquid reaction mixture containing an organic compound of the formula:

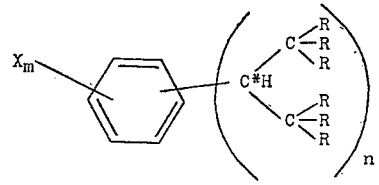

where C* is the tertiary carbon atom to be oxidized, R at each occurrence is a member independently selected from the group consisting of hydrogen and alkyl groups of 1 to 5 carbon atoms, $n$ is an integer of from 1 to 3, X is a member selected from the group consisting of alkyl, hydroxyalkyl, and halogen, and $m$ is an integer of from 0 to 2 with the sum of $m$ and $n$ being no greater than 4 and all unspecified valences are satisfied with hydrogen, and an aqueous solution of tripotassium phosphate with a gas containing elemental oxygen at a temperature of at least about 80° C., there being employed at least about 0.05 mole of tripotassium phosphate per (mole of said organic compound/$n$).

2. A process as claimed in claim 1 wherein said oxidation is conducted at a temperature of from about 100° C. to the boiling point of said liquid reaction mixture.

3. A process as claimed in claim 1 wherein said organic compound is isopropylbenzene.

4. A process as claimed in claim 1 wherein said organic compound is m-diisopropylbenzene.

5. A process as claimed in claim 1 wherein said organic compound is p-diisopropylbenzene.

6. A process as claimed in claim 1 wherein said organic compound is 1,3,5-triisopropylbenzene.

7. A process as claimed in claim 6 wherein said oxidation is conducted at a temperature maintained between 110° C. and the boiling point of the reaction mixture and the amount of tripotassium phosphate employed is at least 0.30 mole per mol of said organic compound.

8. A process as claimed in claim 1 wherein the amount of tripotassium phosphate employed is at least 0.10 mole per (mole of organic compound/$n$).

References Cited

UNITED STATES PATENTS 2,881,220  4/1959  Griffin et al. _____ 260—618

FOREIGN PATENTS 980,272  1/1965  Great Britain.

LEON ZITVER, *Primary Examiner.*

T. G. DILLAHUNTY, *Assistant Examiner.*